Patented Dec. 24, 1935

2,025,032

UNITED STATES PATENT OFFICE 2,025,032

DEHALOGENATION OF ORGANIC HALIDES

Herrick R. Arnold, Elmhurst, and Wilbur A. Lazier, Marshallton, Del., assignors to E. I. du Pont de Nemours & Company, Wilmington, Del., a corporation of Delaware No Drawing. Application September 22, 1933, Serial No. 690,570

16 Claims. (Cl. 260—168)

This invention relates to the dehalogenation of organic halides and more particularly to a process for the dehalogenation of organic halides wherein the halide is caused to react in the vapor phase with hydrogen in the presence of a catalyst.

Alkyl halides dissociate readily to form HCl and olefines. On the other hand, halogen directly linked to the aromatic nucleus forms one of the most stable combinations known to organic chemistry. Only by means of hydrogenation with nickel, platinum, or palladium, had it been possible heretofore to replace such halogen with hydrogen. Nickel rapidly becomes poisoned in the process and the noble metals are impracticable for commercial use. Sabatier ("Catalysis in Organic Chemistry", Van Nostrand, 1923, 403–407) describes the dehalogenation of various aromatic halogen derivatives by the use of nickel, and points out the difficulty involved in the poisoning of the catalyst by halogens.

This invention has as an object to overcome the above mentioned prior art difficulties and to provide an improved process for carrying out the dehalogenation of organic halides in the vapor phase. Another object is to provide a catalytic vapor phase process wherein high yields of dehalogenated products are obtained at either high or low pressures. A more specific object is to provide an improved process for the dehalogenation of aromatic halides in the presence of hydrogen and a catalyst. Other objects will appear hereinafter.

These objects are accomplished by the following invention which in its general aspects comprises bringing an organic halide in the vapor phase mixed with hydrogen, into contact with highly efficient catalysts. The gaseous reactants may be under either atmospheric or superatmospheric pressure, while the temperature may range from 200° to 600° C. We have found that the sulfides of metals occurring in the sixth group of the periodic table, particularly those of the subgroup containing chromium, molybdenum and tungsten are far superior to catalysts of the type previously used in that they are more active, less susceptible to poisoning, and more easily and cheaply prepared.

In the following examples are set forth several of the preferred embodiments of this invention, but they are presented only as illustrations and not as limitations.

Example 1

A catalyst was prepared as follows: 370 g. of ammonium molybdate was dissolved in 350 cc. of distilled water and 250 cc. of ammonium hydroxide. Hydrogen sulfide was then passed through the solution until precipitation of the reddish brown ammonium sulfo-molybdate was complete. The mixture was then diluted with 500 cc. of distilled water and acidified by the addition of a mixture of equal parts by volume of concentrated sulfuric acid and water. The acid solution was added until the precipitate changed in color from dark red to black, the ammonium sulfo-molybdate being thus decomposed to the insoluble molybdenum sulfide. This precipitate was filtered, washed, and dried, compressed into hard cakes and broken up to 8–12 mesh grain size.

Twenty-five cc. of this catalyst was enclosed in a pressure resisting reaction tube and heated to 400° C. in a diphenyl vapor bath. 119 g. or 1.06 moles of chlorbenzene was vaporized per hour and passed together with 7–8 moles of hydrogen through the catalyst under a pressure of 200 atmospheres. Under these conditions 90% of the chlorbenzene was converted to benzene, with the formation of an equivalent amount of HCl. No hydrogenation of the ring occurred.

Example 2

A mixture of 453 g. of ammonium molybdate, and 93 g. of ammonium bichromate was dissolved in 6 liters of distilled water and treated with hydrogen sulfide until there was no further color change. Nitric acid was then added to the mixture until the excess sulfo-molybdate remaining in solution was precipitated as the sulfide. The precipitate was then washed, filtered, and dried.

This catalyst when employed in the dehalogenation of chlorbenzene under the conditions of Example 1 above caused a 90–95% conversion to benzene with little loss in activity over long periods of time.

The advantage to be gained by the use of the catalysts described in this, and the foregoing example, is apparent when it is observed that a catalyst consisting of nickel deposited on an inert support produces a vigorous initial reaction, with evolution of HCl, but rapidly loses all activity becoming completely inert owing to poisoning by chlorine.

Example 3

626 g. of ammonium molybdate was dissolved in 1.3 l. of hot water, allowed to cool, and filtered. H$_2$S was passed into the solution until the precipitate of ammonium sulfo-molybdate which first forms had redissolved. The solution thus formed was poured into 15 l. of distilled water containing 300 cc. concentrated sulfuric acid and allowed to stand for several days, after which the precipitate was filtered, washed, and dried. The dry product was compressed into hard cakes and broken up to granules of 8 to 12 mesh size.

74 g. or 0.66 moles of chlorbenzene per hour was vaporized and passed with 1.8 moles of hydrogen over 10 cc. of this catalyst at atmospheric pressure and a temperature of 475° C. Under these conditions 71% of the chlorbenzene was converted to benzene with no decomposition or hydrogenation of the ring.

*Example 4*

With the same catalyst and conditions described in Example 1 a 90-95% conversion of chlortoluene to toluene is obtained, with a well-sustained activity on the part of the catalyst.

*Example 5*

A sample of benzene recovered from a chlorination process and containing 5% of chlorinated products was purified by passage over chromium sulfo-molybdate under the conditions described in Example 2, and used as a solvent in hydrogenation reactions involving the use of nickel.

*Example 6*

When hydrogen and propyl chloride in the molar ratio 10 to 1 are passed over the catalyst described in Example 2, at 325° C. and atmospheric pressure, almost quantitative conversion to propane and HCl occurs.

*Example 7*

A mixture of equal parts of propyl and butyl bromides when vaporized and mixed with hydrogen in the molar ratio 10 to 1 and passed at atmospheric pressure over the catalyst described in Example 2 heated to 375° C., is nearly quantitatively converted to the respective hydrocarbons and HCl. In a similar process in which a nickel catalyst supported on an inert material was used, a vigorous initial reaction occurred which rapidly slowed down owing to the poisoning of the catalyst by bromine.

The examples given above in no way exhaust the possible applications of this invention. Both aliphatic and aromatic halides may be readily dehalogenated, the former with even greater ease than the latter, owing to their lower degree of stability. Halogenated aliphatic side chains attached to the aromatic nucleus may be readily dehalogenated. Not only chlorine, but bromine and iodine compounds may be dehalogenated, although the reaction proceeds with somewhat greater difficulty in passing from chlorine to iodine owing to the decreasing affinity of the halogens for hydrogen.

The catalyst may consist of the sulfides of chromium, molybdenum, tungsten, or uranium, or mixtures thereof, although for reasons of economy, and because of their greater catalytic efficiency, chromium and/or molybdenum are preferred. These sulfides may be prepared by treating the oxides with H₂S at elevated temperatures, the hydrated oxides with H₂S in solution, or preferably by passing H₂S into solutions of chromates, molybdates, or tungstates, or mixtures thereof.

Since the organic halides are of varying degrees of stability depending upon whether the halogens are attached to aliphatic chains or the aromatic nucleus and upon the affinity of the individual halogens for hydrogen, it is evident that the temperature required for activation may vary widely. In the case of chlorine directly attached to the aromatic nucleus the preferred temperature is in the neighborhood of 400° C. but the range over which the reaction produces substantial yields may extend from 300° C. to 600° C. With halogenated aliphatic chains whether or not they are attached to an aromatic nucleus, the range of operative temperatures may be extended as low as 200° C., the preferred range being 300-375° C.

Good yields are obtained by operating at atmospheric pressure, but the yield is considerably improved by increased pressure. Operative limits extend from 1 up to the limit of pressure which the apparatus will withstand, the preferred pressure being about 200 atmospheres.

It is desirable that a large excess of hydrogen be used, from 5 to 15 moles per mole of halide, a preferred ratio being about 10 to 1.

This invention has many special uses in addition to its broad, general use in removing halogens from organic halides. Probably its greatest usefulness is in its application to the purification of organic compounds containing organic halides as impurities. For example, benzene recovered from the manufacture of chlorobenzene may be freed from chlorine compounds by hydrogenation, followed by an alkaline wash to remove HCl. After such treatment the benzene is sufficiently pure to be hydrogenated to cyclohexane, or to be used as a solvent in other hydrogenation reactions, involving the use of halogen-sensitive catalysts. The invention may be applied to polyhalogenated aromatic or aliphatic compounds, for the removal of either part or all of the chlorine from the molecule. Thus it may be applied to the removal of halides from residual chlorinated hydrocarbons from natural gas, and in the reversion of over-chlorinated benzene. Many syntheses in the aromatic series may be advantageously carried out by the introduction and later removal of aromatic halogens. Finally, this invention may be applied to the field of catalytic reactions in quantitative analysis, as for example, in the substitution of these relatively insensitive catalysts for halogen-sensitive palladium or nickel in the quantitative determination of halogen compounds.

The catalytic dehalogenation of organic halides is not new, but has been involved in difficulties owing to the necessity of using catalysts which were readily poisoned by halogens and their compounds, and which were costly and difficult to prepare. The principal advantage of this invention lies in the use of catalysts which are highly active and at the same time insensitive, not only to the poisonous effect of halogens, but also of sulfur and its compounds as well. Furthermore, they are more practicable than the noble metals such as platinum and palladium in that they are less expensive, their preparation does not involve the difficulties encountered in the preparation of nickel catalysts, and they are not subject to deterioration in storage.

The above description and examples are intended to be illustrative only. Any modification of or variation therefrom which conforms to the spirit of the invention is intended to be included within the scope of the claims.

We claim:

1. The process which comprises hydrogenating a halogenated hydrocarbon in the vapor phase with a molar excess of hydrogen in the presence of a catalyst, the active constituent of which comprises essentially a sulfide of a metal taken from Group VI, Sub-Group A, of the periodic table at a temperature of 200–600° C.

2. The process in accordance with claim 1 characterized in that the active constituent of the catalyst comprises essentially sulfides of chromium and molybdenum.

3. The process in accordance with claim 1 characterized in that the active constituent of the catalyst comprises essentially molybdenum sulfide.

4. The process in accordance with claim 1 characterized in that the active constituent of the catalyst comprises essentially chromium sulfide.

5. The process which comprises hydrogenating a halogenated hydrocarbon in the vapor phase in the presence of a catalyst, the active constituent of which comprises essentially a sulfide of a metal taken from Group VI, Sub-Group A, of the periodic table at a temperature of 200–600° C., the molar ratio of hydrogen to the compound under treatment being 5:1 to 15:1.

6. The process of claim 5 further characterized in that the pressure is greatly in excess of atmospheric pressure.

7. In a process of dehalogenating organic halides by substituting the halogen with hydrogen, the steps of treating the vapor of a halogen substituted aliphatic hydrocarbon with a substantial molar excess of hydrogen at a temperature of 200–600° C. and in the presence of a catalyst, the active constituent of which comprises essentially a sulfide of a metal taken from Group VI, Sub-Group A, of the periodic table.

8. The process of claim 7 characterized in that the reaction is carried out under high superatmospheric pressure.

9. The process of claim 7 in which the compound referred to is a monochlor-paraffin.

10. In a process of dehalogenating organic halides by substituting the halogen with hydrogen, the steps of treating the vapor of a chlor-substituted aliphatic hydrocarbon with about 5 to 15 mols of hydrogen per mol of compound under treatment at a temperature of 300–325° C., under high superatmospheric pressure and in the presence of a catalyst, the active constituent of which comprises essentially the sulfides of chromium and molybdenum.

11. In a process of dehalogenating organic halides by substituting the halogen with hydrogen, the steps of passing hydrogen and the vapor of propyl chloride in the molar ratio of about 10:1 over a catalyst, the active constituent of which comprises essentially the sulfides of chromium and molybdenum at about 325° C. and under high superatmospheric pressure.

12. In a process of dehalogenating organic halides by substituting the halogen with hydrogen, the steps of treating the vapor of a halogen substituted aromatic hydrocarbon with a substantial molar excess of hydrogen at a temperature of 300–600° C. and in the presence of a catalyst, the active constituent of which comprises essentially a sulfide of a metal taken from Group VI, Sub-Group A, of the periodic table.

13. The process of claim 12 characterized in that the reaction is carried out under high superatmospheric pressure.

14. In a process of dehalogenating organic halides by substituting the halogen with hydrogen, the steps of treating the vapor of a chlor-substituted aromatic hydrocarbon with about 5 to 15 mols of hydrogen per mol of compound under treatment at a temperature of 300–325° C., under high superatmospheric pressure and in the presence of a catalyst, the active constituent of which comprises essentially the sulfides of chromium and molybdenum.

15. The process of claim 14 in which the compound referred to is a monochlor-mononuclear aromatic hydrocarbon.

16. In a process of dehalogenating organic halides by substituting the halogen with hydrogen, the steps of passing hydrogen and the vapor of monochlorbenzene in the molar ratio of about 7:1 to 8:1 over a catalyst, the active constituent of which comprises essentially molybdenum sulfide at about 400° C. and under high superatmospheric pressure.

HERRICK R. ARNOLD.
WILBUR A. LAZIER.